(12) United States Patent
Edwards et al.

(10) Patent No.: US 9,389,425 B2
(45) Date of Patent: Jul. 12, 2016

(54) VIEWER WITH DISPLAY OVERLAY

(71) Applicant: Kopin Corporation, Taunton, MA (US)

(72) Inventors: Timothy James Edwards, Scotts Valey, CA (US); Mark Crane, San Jose, CA (US); Cathy Ji Kyung Yoon, Scotts Valley, CA (US); Timothy Brandon Hogan, Allen, TX (US)

(73) Assignee: Kopin Corporation, Westborough, MA (US)

( * ) Notice: Subject to any disclaimer, the term of this patent is extended or adjusted under 35 U.S.C. 154(b) by 290 days.

(21) Appl. No.: 13/800,843

(22) Filed: Mar. 13, 2013

(65) Prior Publication Data

US 2013/0279013 A1    Oct. 24, 2013

Related U.S. Application Data

(60) Provisional application No. 61/625,808, filed on Apr. 18, 2012.

(51) Int. Cl.
*G02B 27/14* (2006.01)
*G09G 5/00* (2006.01)
(Continued)

(52) U.S. Cl.
CPC ............. *G02B 27/0189* (2013.01); *F41G 1/38* (2013.01); *G02B 23/10* (2013.01);
(Continued)

(58) Field of Classification Search
CPC ............. G02B 27/01; G02B 2027/014; G02B 2027/0123; G02B 27/017; G02B 2027/0178; G02B 2027/0118; G02B 2027/013; G02B 2027/0147; G02B 27/0172; G02B 27/102; H04N 9/3108; G02F 1/133603

USPC .................................. 359/630–634; 345/7–9
See application file for complete search history.

(56) References Cited

U.S. PATENT DOCUMENTS 4,949,089 A    8/1990    Ruszkowski, Jr.
5,103,254 A    4/1992    Bell et al.
(Continued)

FOREIGN PATENT DOCUMENTS

CN    101632033 A    1/2010
EP    0 803 756 A1    10/1997
(Continued)

OTHER PUBLICATIONS

International Preliminary Report on Patentability dated Oct. 21, 2014.
(Continued)

*Primary Examiner* — Alicia M Harrington
(74) *Attorney, Agent, or Firm* — Hamilton, Brook, Smith & Reynolds, P.C.

(57) ABSTRACT

A real-world viewer can include viewing optics positioned along a viewing optical axis for viewing a field of view of the real-world. An active display overlay unit can be optically coupled to the viewing optical axis of the viewing optics, for generating images and directing the images along the viewing optical axis of the viewing optics for simultaneous overlaid viewing of the images in the real-world scene as viewed in the field of view through the viewing optics. The active display overlay unit can be capable of providing full-color luminance of at least t 1200 fL to the ocular of the host system with a luminance to power fL:mW ratio of at least 6:1 or greater or providing monochrome luminance from the active display overlay unit of at least 5000 fL to the ocular of the host system with a luminance to power fL:mW ratio of at least 15:1 or greater.

42 Claims, 13 Drawing Sheets

(51) Int. Cl.
 *G02B 27/01*      (2006.01)
 *G02B 23/10*      (2006.01)
 *F41G 1/38*       (2006.01)

(52) U.S. Cl.
 CPC ....... *G02B 27/0101* (2013.01); *G02B 27/0172* (2013.01); *G02B 2027/0112* (2013.01); *G02B 2027/0118* (2013.01)

(56) References Cited

U.S. PATENT DOCUMENTS

| | | | |
|---|---|---|---|
| 5,311,203 | A | 5/1994 | Norton |
| 6,252,706 | B1 | 6/2001 | Kaladgew |
| 6,516,551 | B2 | 2/2003 | Gaber |
| 7,196,329 | B1 * | 3/2007 | Wood et al. .................. 250/330 |
| 7,295,296 | B1 | 11/2007 | Galli |
| 7,325,320 | B2 | 2/2008 | Gnepf et al. |
| 7,333,270 | B1 | 2/2008 | Pochapsky et al. |
| 7,575,327 | B2 | 8/2009 | Uchiyama |
| 7,654,029 | B2 | 2/2010 | Peters et al. |
| 7,690,145 | B2 | 4/2010 | Peters et al. |
| 7,719,769 | B2 | 5/2010 | Sugihara et al. |
| 7,805,020 | B2 | 9/2010 | Trudeau et al. |
| 7,859,650 | B2 | 12/2010 | Vermillion et al. |
| 7,864,432 | B2 | 1/2011 | Ottney |
| 8,046,951 | B2 | 11/2011 | Peters et al. |
| 8,051,597 | B1 | 11/2011 | D'Souza et al. |
| 8,081,298 | B1 | 12/2011 | Cross |
| 2003/0012035 | A1 * | 1/2003 | Bernard .................. 362/555 |
| 2003/0132860 | A1 * | 7/2003 | Feyereisen et al. ........... 340/973 |
| 2005/0250085 | A1 | 11/2005 | Lemp, III et al. |
| 2009/0205239 | A1 | 8/2009 | Smith, III |
| 2010/0207152 | A1 * | 8/2010 | Won .................... H01L 25/167 257/98 |
| 2010/0225833 | A1 * | 9/2010 | Methe et al. .................. 349/11 |
| 2011/0121159 | A1 | 5/2011 | Mourar et al. |
| 2011/0141381 | A1 | 6/2011 | Minikey, Jr. et al. |
| 2012/0075168 | A1 | 3/2012 | Osterhout et al. |
| 2012/0097741 | A1 | 4/2012 | Karcher |
| 2014/0226214 | A1 | 8/2014 | Edwards et al. |

FOREIGN PATENT DOCUMENTS

| | | |
|---|---|---|
| GB | 2068091 A | 8/1981 |
| GB | 2 238 627 A | 6/1991 |
| WO | WO 00/73843 A1 | 12/2000 |
| WO | WO 2008/088691 A2 | 7/2008 |
| WO | WO 2009/094399 A1 | 7/2009 |
| WO | WO 2013/158495 A1 | 10/2013 |

OTHER PUBLICATIONS

Sottilare, et al., "Injecting Realistic Human Models into the Optical Display of a Future Land Warrior System for Embedded Training Purposes", JDMS: Journal of Defense Modeling and Simulation, Apr. 2007. vol. 4, No. 2, 20 pages. <http://www.scs.org/pubs/jdms/vol4num2/LaurieMarshall.pdf>.

Hicks, Jeffery, "Eyekon: Distributed Augmented Reality for Soldier Teams"Papillion, Nebraska: $21^{st}$ Century Systems, Inc. Accessed May 16, 2012. p. 8-14. <http://www.dodccrp.org/events/8th_ICCRTS/pdf/118.pdf>.

Recon Instruments, "MOD Live Features", [online] May 16, 2012, Retrieved from the Internet URL: http://www.reconinstruments.com/products/features.

Recon Instruments, "MOD Live GPS", [online] May 16, 2012, Retrieved from the Interntet URL: http//www.reconinstruments.com/products/mod.

Moran, J. and Smith, M.J., "America's Most Deployed Weapon System", PM Soldier Weapons, Briefing for the $31^{st}$ Annual Firepower Symposium, Mar. 2, 2004, 31 pages. <http://www.dtic.mil/ndia/2004armaments/06_Audette_Fire_Power.pdf>.

Notification of Transmittal of The International Search Report and The Written Opinion of the International Searching Authority for Int'l Application No. PCT/US2013/036400; Entitled: "Viewer With Display Overlay," Date Mailed: Jul. 8, 2013.

Li, Shu et al., "Extra High Luminance Backlight for Helmet-Mounted Display Sighting System for Advanced Rotorcraft," *Proceedings of SPIE*, vol. 4711, pp. 11-19 (Aug. 5, 2002).

* cited by examiner

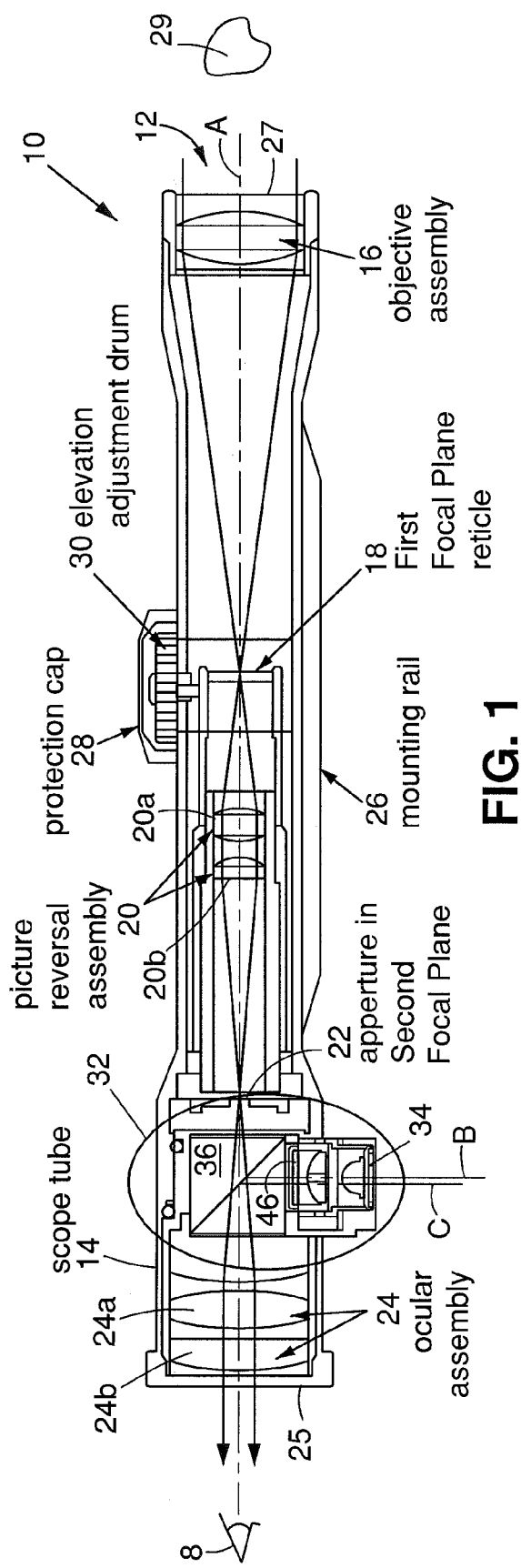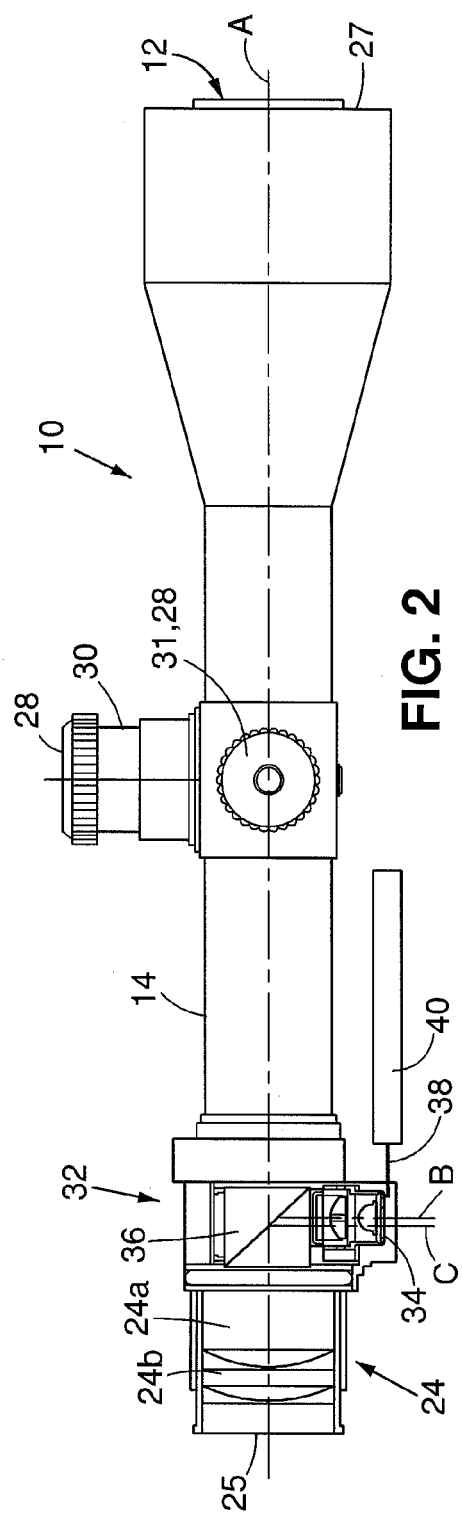

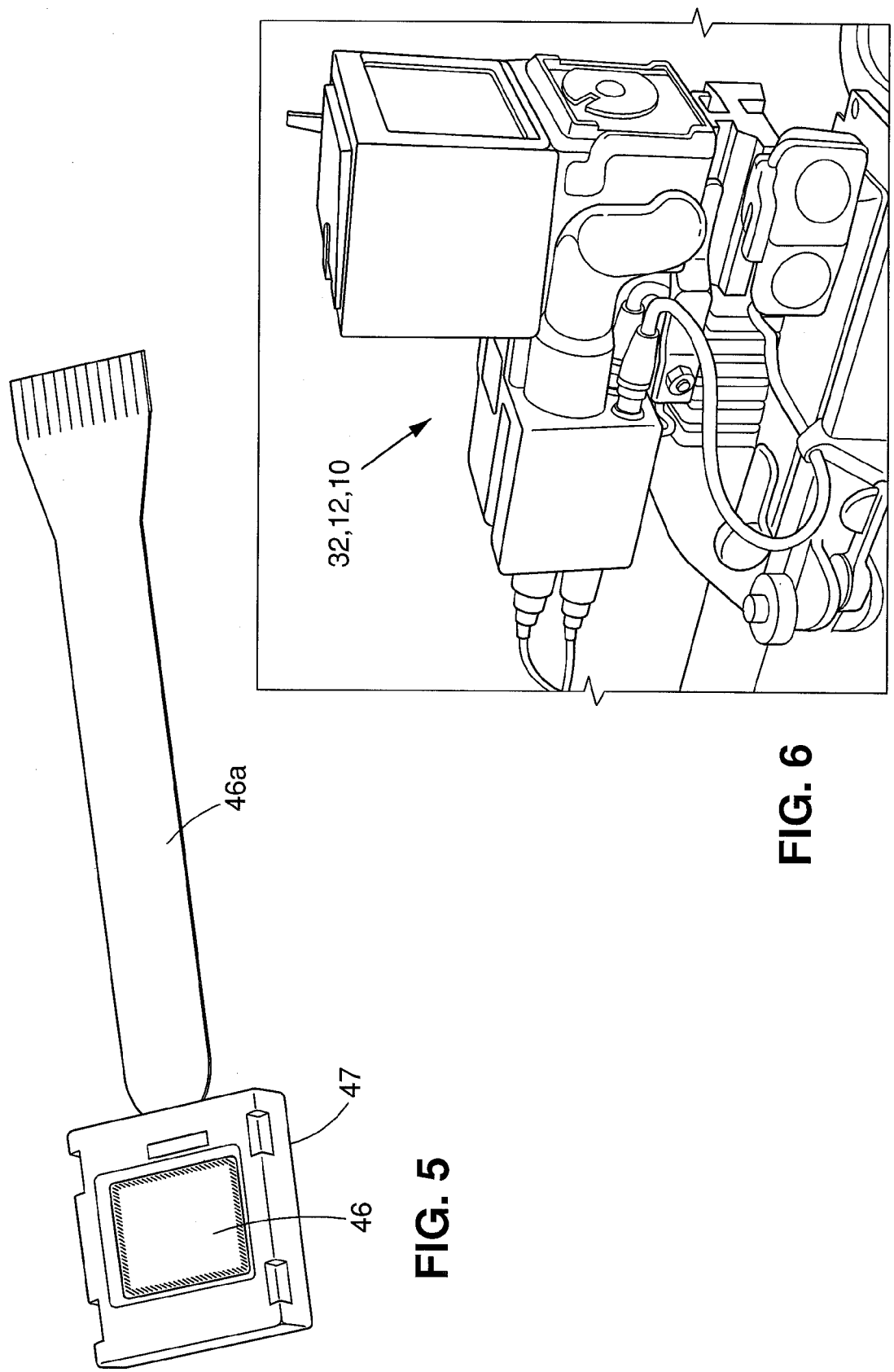

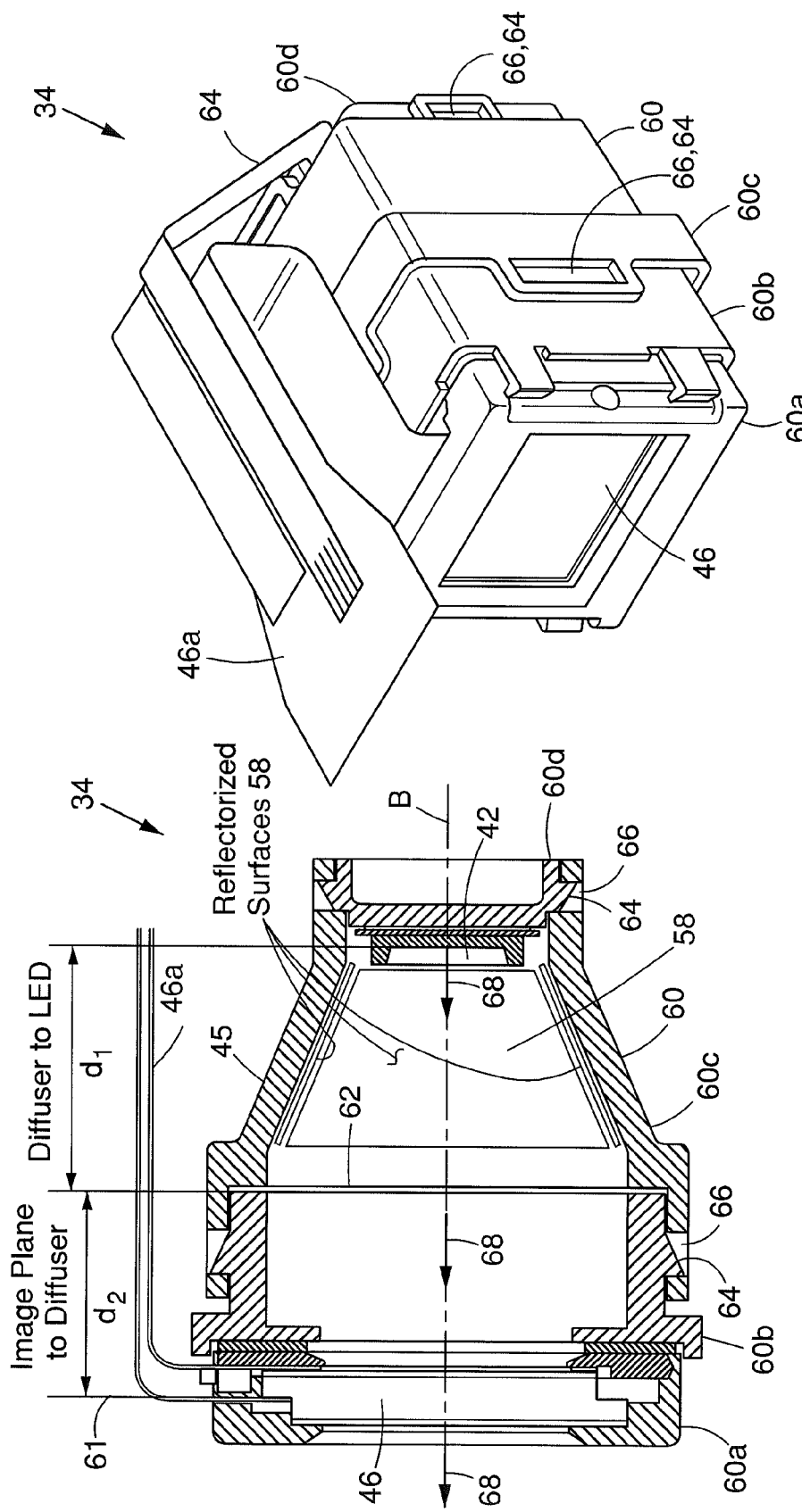

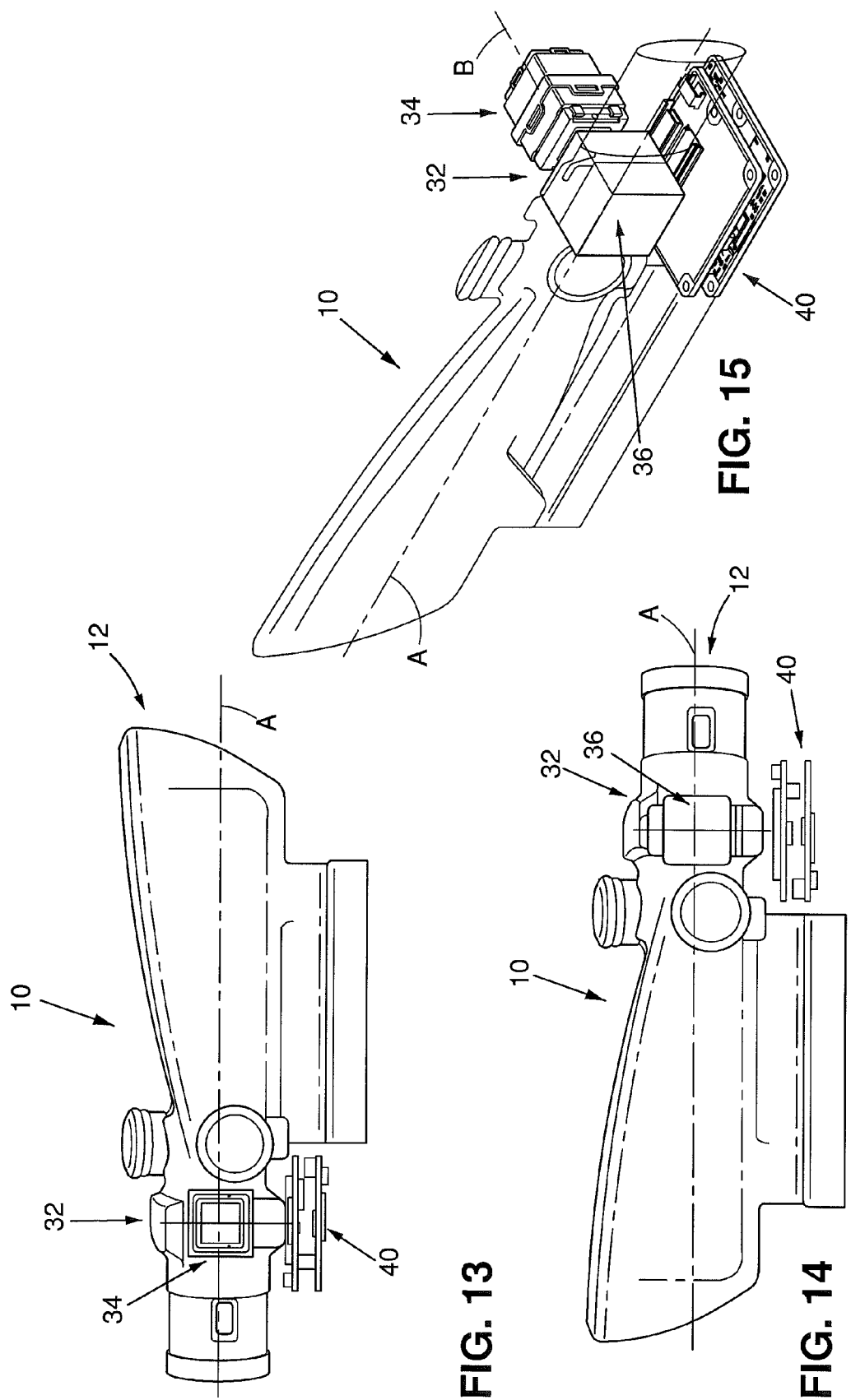

VIEWER WITH DISPLAY OVERLAY

RELATED APPLICATION

This claims the benefit of U.S. Provisional Application No. 61/625,808, filed on Apr. 18, 2012. The entire teachings of the above application are incorporated herein by reference.

BACKGROUND

Direct view optical weapon sights such as a rifle scope typically have optics with a fixed reticle for viewing and acquiring targets.

SUMMARY

The present invention can provide active display capabilities within a real-world viewer. The real-world viewer can include viewing optics positioned along a viewing optical axis for viewing a field of view of the real-world. An active display overlay unit can be optically coupled to the viewing optical axis of the viewing optics, for generating images and directing the images along the viewing optical axis of the viewing optics for simultaneous overlaid viewing of the images in the real-world scene as viewed in the field of view through the viewing optics. The active display overlay unit can be capable of providing full-color luminance of at least 1200 fL to the ocular of the host system with a luminance to power FL:mW ratio of at least 6:1 or greater.

In particular embodiments, the viewer can be at least one of a weapon sight, an add-on accessory to a weapon sight, a rifle sight, an add-on accessory to a rifle sight, a surveillance system, an add-on accessory to a surveillance system, a fire-control system, an add-on accessory to a fire-control system, a laser target locator and designator, an add-on accessory to laser target locator and designator, a head or helmet mounted display, an add-on accessory to a head or helmet mounted display, a range finder or an add-on accessory to a range finder. The active display overlay unit can include an active display for generating the images along a display optical axis. A beam combiner can be aligned with the display along the display optical axis, and positioned along the viewing optical axis of the viewing optics for directing the images from the display onto the viewing optical axis for combining with the field of view that is viewed by the viewing optics in an overlaid manner. The viewing optics can be positioned along a longitudinal viewing optical axis. The display optical axis of the active display overlay unit can be at an angle to the viewing optical axis of the viewing optics. The active display overlay unit can include an active transmissive display, and an LED backlight for illuminating the active transmissive display with LED illumination. The LED backlight can be configured to produce or provide a cone angle of illumination from the active transmissive display that substantially matches the viewing cone angle of the viewing optics. The LED backlight can be configured to produce or provide a cone angle of illumination of about +/−10° or less from the active transmissive display. The active display overlay unit can include a lens arrangement for concentrating the LED illumination onto the active transmissive display. The lens arrangement can include an integrated lens integrated into the LED backlight and a condenser lens positioned between the integrated lens and the active transmissive display. The active display overlay unit can be capable of providing monochrome luminance of at least 5000 fL to the ocular of the host system with the luminance to power fL:mW ratio of at least 15:1 or greater. Electronics can be included for controlling the active display. The active display can provide images for at least one of an active target reticle, range and wind information, GPS and compass information, target ID, and/or external sensor information and/or video. A housing can be included for containing the viewing optics and the active display overlay unit. The field of view can include target or situational awareness elements therein. The active overlay display unit can be configured to control brightness to allow for viewing under ambient conditions ranging from full sunlight to overcast starlight. The active overlay display unit can be capable of outputting a specific wavelength of imagery and dimming for viewing the real-world and active overlay display unit images using an image intensifier night vision device or thermal imaging device. The active overlay display unit can provide at least one of a monochrome, multi-color and/or full color overlaid image. The active overlay display unit can provide at least one of a bi-level and/or full gray scale overlay image. Mechanical and electrical boresight capabilities can be included to the real-world viewing optical axis. Means can be included to package the active display overlay unit as an integral part of the real-world viewer. The active display overlay unit can be an accessory add-on device to the real-world viewer.

The present invention can also provide a weapons sight including direct viewing optics positioned along a longitudinal viewing optical axis for viewing a field of view of the real-world. An active display overlay unit can be optically coupled to the viewing optical axis of the viewing optics, for generating images and directing the images along the viewing optical axis of the viewing optics for simultaneous overlaid viewing of images in the real-world scene as viewed in the field of view through the viewing optics. The active display overlay unit can be capable of providing full-color luminance of at least 1200 fL to the ocular of the host system with a luminance to power fL:mW ratio at least 6:1 or greater. The active display overlay unit can include an active transmissive display for generating the images along a display optical axis, an LED backlight for illuminating the active transmissive display with LED illumination and configured to provide a cone angle of about +/−10° or less from the active transmissive display.

The present invention can also provide a method of viewing with a real-world viewer including viewing the field of view of the real world with viewing optics positioned along a viewing optical axis, and simultaneously viewing images generated by an active display overlay unit optically coupled to the viewing optical axis of the viewing optics. The images can be directed along the viewing optical axis of the viewing optics for simultaneous overlaid viewing of images and the real-world scene as viewed in the field of view through the viewing optics. The active display overlay unit can be capable of providing full-color luminance of at least 1200 fL to the ocular of the host system with the luminance to power fL:mW ratio of at least 6:1 or greater.

In particular embodiments, the viewer can be employed as at least one of a weapon sight, an add-on accessory to a weapon sight, a rifle sight, an add-on accessory to a rifle sight, a surveillance system, an add-on accessory to a surveillance system, a fire-control system, an add-on accessory to a fire-control system, a laser target locator and designator, an add-on accessory to laser target locator and designator, a head or helmet mounted display, an add-on accessory to a head or helmet mounted display, a range finder, or an add-on accessory to a range finder. The images can be generated in the active display overlay unit with an active display and along the display optical axis. A beam combiner can be aligned with the active display along the display optical axis. The beam combiner can be positioned along the viewing optical axis of the viewing optics for directing the images from the active display onto the viewing optical axis for combining with the field of view that is viewed by the viewing optics in an overlaid manner. The viewing optics can be positioned along a longitudinal viewing optical axis. The display optical axis of the active display overlay unit can be positioned at an angle to the viewing optical axis of the viewing optics. The active display can be an active transmissive display. The active transmissive display of the active display overlay unit can be illuminated with LED illumination from an LED backlight. The LED backlight can be configured to provide a cone angle of illumination from the active transmissive display that substantially matches the viewing cone angle of the viewing optics. A cone angle of illumination of about +/−10° or less can be provided from the active transmissive display. The LED illumination can be concentrated onto the active display with a lens arrangement. The lens arrangement can be provided with an integrated lens integrated in the LED backlight and a condenser lens can be positioned between the integrated lens and the active transmissive display. Monochrome luminance can be provided from the active display overlay unit to the ocular of the host system of at least 5000 fL with a luminance to power fL:mW ratio of 15:1 or greater. The active display can be controlled with electronics. The active display can provide images for at least one of an active target reticle, range and wind information, GPS and compass information, target ID, and/or external sensor information. The viewing optics and the active display overlay unit can be contained within a housing. Target or situational awareness elements can be viewed in the field of view. The active display brightness can be controlled to allow for viewing under ambient conditions ranging from full sunlight to overcast starlight. A specific wavelength of imagery and dimming of the active overlay display unit can allow for viewing the real-world and active overlay display unit images using an image intensifier night vision device or thermal imaging device. At least one of a monochrome, multi-color and/or full color overlaid image can be provided. A bi-level and/or full gray scale overlay image can be provided. Mechanical and electrical boresight capabilities to the real-world viewing optical axis, can be provided. Means to package the active display overlay unit as integral part of the real world viewer can be provided. The active display overlay unit can be an accessory add-on device to the real-world viewer.

The present invention can also provide a method of viewing with a weapons sight including viewing a field of the real-world with direct viewing optics positioned along a longitudinal viewing optical axis, and simultaneously viewing images generated by an active display overlay unit optically coupled to the viewing optical axis of the viewing optics. The images can be directed along the viewing optical axis of the viewing optics for simultaneous overlay viewing of images and the real-world scene as viewed in the field of view through the viewing optics. The active display overlay unit can provide full-color luminance of at least 1200 fL to the ocular of the host system with a luminance to power fL:mW ratio at least 6:1 or greater. The active display overlay unit can include an active transmissive display generating the images along a display optical axis, an LED backlight illuminating the active transmissive display with LED illumination and configured to provide a cone angle of about +/−10° or less from the active transmissive display.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 1 is a schematic side sectional view of an embodiment of a sight, scope or viewer in the present invention.

FIG. 2 is a side view of another embodiment of a sight, scope or viewer in the present invention with a portion in section showing an embodiment of an active display overlay unit.

FIG. 5 is a perspective view of an embodiment of an active display.

FIG. 6 is a perspective view of an embodiment of the present invention including a crew served weapon sight.

FIG. 7 is a side sectional view of one embodiment of a backlight/display module or assembly.

FIG. 10 is a perspective view of another embodiment of a backlight/display module or assembly.

FIG. 13-15 are views from three different directions of an embodiment in the present invention.

DETAILED DESCRIPTION

Figure 3:
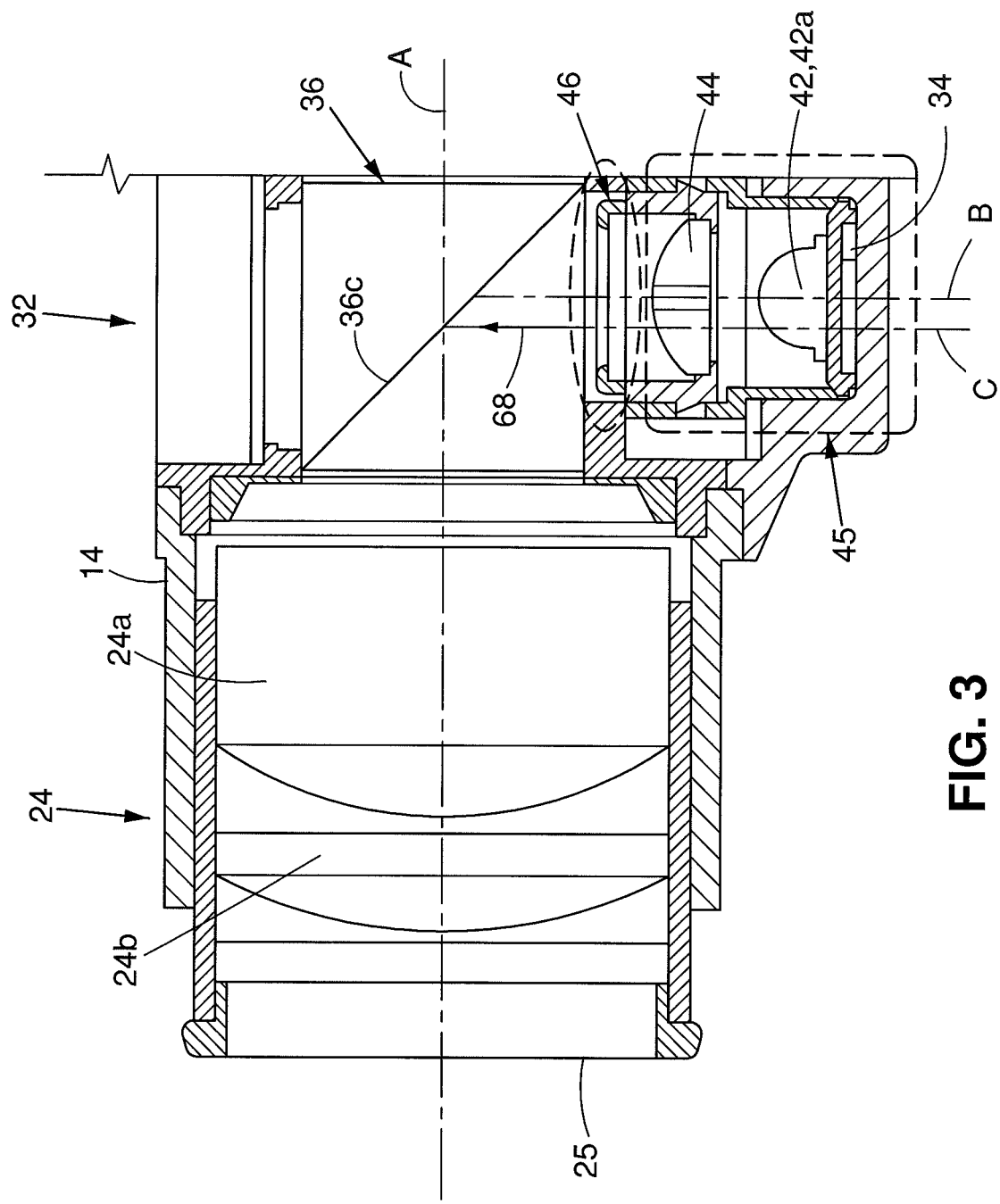
FIG. 3 is an enlarged view of the sectional portion of FIG. 2.
Figure 4:
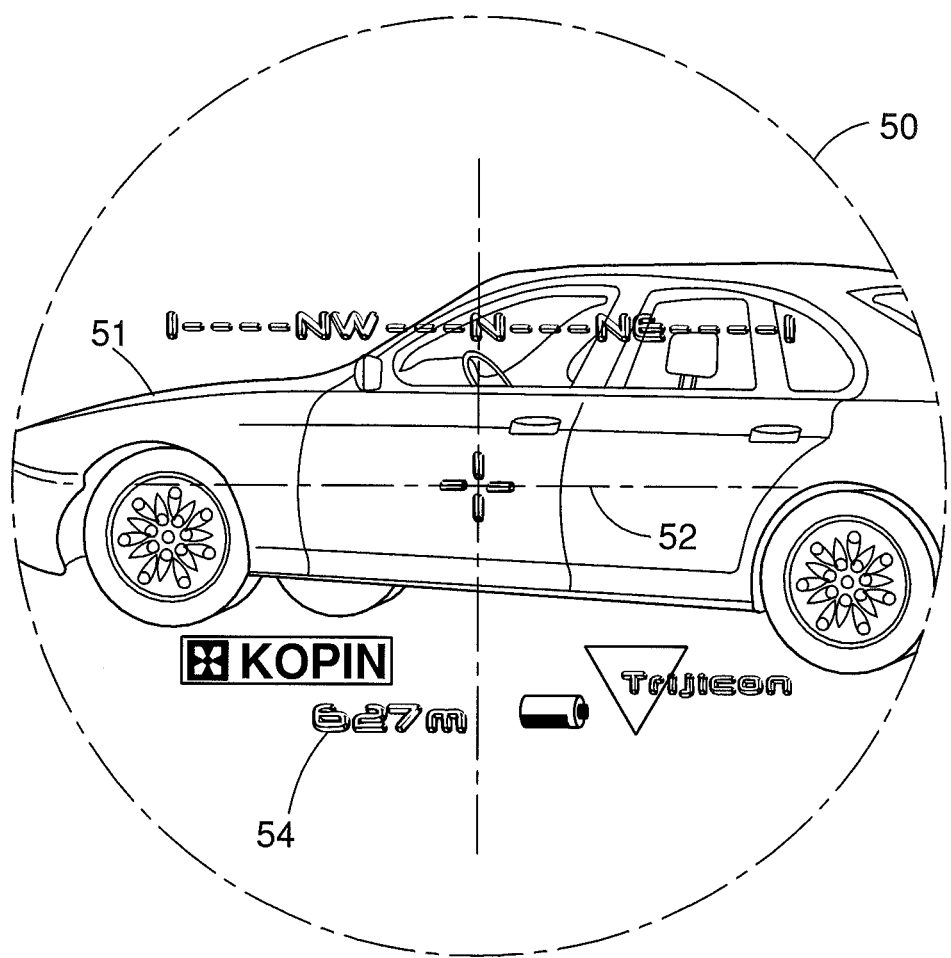
FIG. 4 is an example of the view through the optics of an embodiment of the present invention, in which the real world can be simultaneously viewed with overlaid images.

Referring to FIGS. 1-3, viewer 10 can be a display or viewing apparatus, device, sight, or scope in the present invention, which can be for or on, or part of a weapon, gun, rifle, surveillance system, fire-control system, laser target locater, range finder, or as a add-on accessory thereto. Embodiments can be mounted on a weapon, or apparatus, or can be hand held or helmet mounted. In one embodiment, viewer 10 can be used as a weapon, rifle or gun sight or scope, and can include direct visual optics, or direct view or viewing optics 12, positioned within a scope tube, assembly or optics housing 14 along viewing optical axis A, such as an inline longitudinal axis, for viewing real-world images 51 (FIG. 4). The optics 12 can have a viewing input end 27, and a viewing output end or eyepiece 25, which can be aligned along viewing optical axis A, and can be inline. Objects or targets 29 can be directly viewed with viewer 10 by the eye 8 of the user through the viewing input end 27, along the viewing direct view optics 12, and out the viewing output end 25. The viewing optics 12 can include an objective lens or lens assembly 16 at the viewing input end 27. A first focal plane reticle 18 can be positioned and spaced rearwardly along the viewing optical axis A from the objective lens assembly 16. A picture or image reversal lens assembly 20 can be positioned and spaced rearwardly along the viewing optical axis A from the first focal plane reticle 18. The picture reversal assembly 20 can include two lenses 20a and 20b spaced apart from each other. An aperture in a second focal plane 22 can be positioned and spaced rearwardly along the viewing optical axis A from the picture reversal assembly 20. An ocular lens assembly 24 can be positioned and spaced rearwardly along the viewing optical axis A from the aperture in the second focal plane 22, at the eyepiece 25. The ocular lens assembly can include two lenses 24a and 24b spaced apart from each other. Lenses 24a and 24b can include more than one lens element. In some embodiments, the viewing optical axis A and the direct viewing optics 12 can be folded.

An active display overlay unit 32 can be optically coupled to the viewing optical axis A of the direct viewing optics 12 for generating images (54 (FIG. 4) with an active display 46 and directing the images 54 along the optical axis A for simultaneous overlaid viewing of the generated images 54 and images 51 of the real-world scene, including targets 29, when looking through the direct viewing optics 12 through eyepiece 25. The active display overlay unit 32 can direct generated images 54 along a display optical axis B, which can be at any angle to viewing optical axis A, such as at a right angle. The images 54 can be redirected from the display optical axis B onto the viewing optical axis A with a beam combiner 36 for simultaneously superimposing or overlaying the images 54 onto the images 51 of the scene viewed by the viewer through the optics 12. The active display overlay unit 32 can include a backlight/display device, apparatus, assembly, module or arrangement 34 for generating the images 54, and a beam combiner 36 for combining the images 54 with the images 51 of the direct viewing optics 12. The beam combiner 36 of the active display overlay unit 32 can be positioned on and optically coupled to viewing optical axis A, between lens assemblies 20 and 24, such as between the aperture in the second focal plane 22 and the ocular lens assembly 24. The active display 46 can generate images 54 that can include text, alpha-numerics, graphics, symbology and/or video imagery, icons, etc., including active target reticles, range measurements and wind information, GPS and compass information, target finding, recognition and identification (ID) information, and/or external sensor information (sensor video and/or graphics), or images for situational awareness, for viewing through the eyepiece 25 along with the images 51 of the view seen through optics 12. The direct viewing optics 12 can include or maintain the existing reticle and bore sight, and retain high resolution.

The beam combiner 36 can provide the optical function that combines the direct viewing optics 12 see through path along viewing optical axis A, with the display overlay path along display optical axis B. The center line C of the beam combiner 36 can be offset from the display optical axis B, by a small amount. In some embodiments, the center line C can be aligned with axis B. The beam combiner 36 can have a partially reflecting coating or surface 36c that reflects and redirects the output or at least a portion of the active display 46 output from axis B onto axis A to the viewer's eye 8 at eyepiece 25 while still providing good transmissive see-through for the direct viewing optics 12 path. The beam combiner 36 can be a beam splitter cube made of optical material, such as optical glass or plastic materials with a partially reflective coating 36c. The coating 36c can be a uniform and neutral color reflective coating, or can be tailored with polarizing, spectrally selective or patterned coatings to optimize both the transmission and reflection properties in the eyepiece 25. The polarization and/or color of the coating 36c can be matched to the display 46. This can optimize reflectance and efficiency of the display optical path with minimal impact to the direct viewing optics 12 transmission path. Although the beam combiner 36 is shown as a cube, in some embodiments, the beam combiner 36 can have different optical path lengths for the active display overlay unit 32 or display 46 along display optical axis B, and the direct viewing optics 12 along viewing optical axis A. In some embodiments, the beam combiner 36 can be of a plate form, where a thin reflective/transmissive plate can be inserted in the direct viewing optics 12 path across the optical axes A and B.

Referring to FIGS. 2 and 3, the active display 46 can be a reflective, transmissive or an emissive micro-display, and can be a microdisplay such as a Kopin Corporation, Taunton, Mass., transmissive active matrix LCD display (AMLCD). The active display 46 can be monochrome or can provide full color, and in some embodiments, can provide multi-color. In other embodiments, other suitable designs or types of displays can be employed. The active display 46 can be driven by electronics 40, via line 38 (FIG. 2). The electronics 40 can include the ability to generate display symbols, format output for the display, and include battery information, batteries, or connect to batteries, power conditioning circuitry, video interface, serial interface and control features. Other features can be included for additional or different functionality of the active display overlay unit 32. The electronics 40 can provide display functions, or can receive such functions from another device in communication therewith.

The active display 46 can be part of a backlight/display assembly, module or arrangement 34, having a backlight assembly 45 including a backlight illumination or light source, device, apparatus or member 42, such as an LED backlight for illuminating the active display 46 with light 68. In some embodiments, the backlight source 42 can be a large area LED and can include a first or an integrated lens 42a, for collecting and directing generated light 68 to a second, illumination or condenser lens 44, for collecting, concentrating and directing the light 68 onto active display 46, along display optical axis B, with good spatial and angular uniformity. The illuminated images 54 from active display 46 are then directed to the beam combiner 36 for combining with images 51 seen through the direct viewing optics 12, for viewing at eyepiece 25. The backlight assembly 45, active display 46, and the active display overlay unit 32 are able to provide images 54 with sufficient high brightness luminance to be simultaneously viewed with a very high brightness real world view through optics 12, while being at low power. The backlight 42 color can be selected to be any monochrome color, or can be white to support a full color microdisplay. Other backlight design elements can be included, such as other light sources, waveguides, diffusers, micro-optics, polarizers, birefringent components, optical coatings and reflectors for optimizing performance of the backlight 42, and which are compatible with the overall size requirements of the active display overlay unit 32, and the luminance, power and contrast needs.

When the viewer 10 is a weapon sight such as a gun or rifle sight or scope, the viewer 10 can still allow the existing features of the direct view optics sight to be provided such as target finding, target recognition, target identification, range measurement and targeting. The existing direct viewing optics 12 can maintain the existing reticle and boresight, and can retain the high resolution direct viewing optics 12 image. Additional capabilities provided by the active display overlay unit 32 can include an active target reticle, display of range and/or wind information, display GPS and/or compass information, display target identification (ID), and display an external sensor image overlayed with the direct viewing optics 12 (sensor video and/or graphics). Prior art direct viewing sights typically incorporated fixed or mechanically adjustable reticles or targeting references, while the active display overlay unit 32 can provide electrically dynamic information and targeting references which provides enhanced capability. Spectrally selective and polarized coatings 36c can be used to provide efficient see through directing viewing optics 12 with efficient reflectance for the active display overlay unit 32.

FIG. 4 depicts an example of the view through an embodiment of viewer 10, showing the viewed or image field 50 which includes real world images 51 seen through the direct viewing optics 12, as well as overlayed images 54 from the active display overlay unit 32. The direct viewing optics 12 can include an existing reticle or cross hair 52 visible in the image field 50, which can be fixed or mechanically adjustable. The overlayed images 54 shown, include examples of compass information, an active target reticle, battery information, icons, text, and range information. It is understood that depending upon the embodiment or desired functionality, additional images can be overlayed to include further features, including those previously described. Also the active display overlay unit 32 can be controlled by electronics 40 to switch between different functions to show different images 54 or groupings of images 54 at a given moment in time.

In the embodiment seen in FIGS. 1 and 2, the optics housing 14 of the viewer 10 can include a mounting rail 26 for mounting to a desired weapon, equipment or device, and can have an adjustment mechanism 30 including an elevation adjustment drum for adjusting the elevational position of the optics 12. A lateral adjustment mechanism 31 (FIG. 2) similar to mechanism 30 is also typically provided for side-to-side adjustment. The adjustment mechanisms can be covered with a protection cap 28.

Referring to FIG. 5, in one embodiment, active display 46 can have a frame 47 and can be connected to a flexible or flex cable 46a that provides power and control signals to the display 46. Active display 46 in one embodiment, can be a Kopin LV64OM Monochrome AMLCD with a resolution of 640×480 pixels, 15 μm×15 μm pixel size, 9.6 mm×7.2 mm image plane size, typical power of 20 milliwatts (mW), an integrated flex connector cable 46a, internal heaters for cold temperature operation, an operating temperature of −40° C. to 65° C. and a storage temperature of −50° C. to 86° C. In other embodiments, active display 46 can have full color, multicolor, other resolutions, pixel sizes, dimensions and specifications, and other suitable displays or types of displays or designs can be used. Light shielding can be included in some embodiments.

FIG. 6 depicts an example of an embodiment of a viewer 10 including a 1× crew served weapon sight with direct viewing optics 12. The active display overlay unit 32 can include a plate beam combiner 36, and backlight/display assembly 34 with high brightness such as seen in FIG. 7. The backlight/display assembly 34 can have a 640×480 monochrome active display 46, can have at least about 1200 fL or greater luminance at 200 milliwatts (mW), can have about 200:1 or greater contrast and about a 1,000,000:1 dimming range. A 1200 fL or greater luminance at 200 mW can provide a luminance to power fL:mW ratio of 6:1 or greater. Some embodiments can have full color luminance. Such luminance provided to the viewing optical axis A can allow viewing of images 54 in the daytime. The content can include an overlay reticle system from active display overlay unit 32, and can include a daytime and image intensifier tube ($I^2T$) viewable overlay reticle/thermal system. The backlight/display assembly 34 can include a housing 60 for housing and positioning an LED light source 42, a diffuser 62 and active display 46 along display optical axis B. The housing 60 can be formed by more than one component assembled together, such as housing portions 60a, 60b, 60c and 60d, which can be assembled together to house and hold display 46, diffuser 62 and light source 42 in position. Portions or all of the housing 60 can be made of aluminum to act as a heat sink for light source 42. Housing portion 60c can have outwardly angling reflecting or reflectorized surfaces 58 extending between light source 42 and diffuser 62, for reflecting and directing light 68 to the diffuser 62. The light source 42 in some embodiments can be a quad amber LED, and can be spaced or positioned apart from or behind the diffuser 62 by a distance $d_1$, such as about 8 mm. The diffuser 62 can be spaced or positioned apart from or behind the active display 46 by a distance $d_2$, such as about 7 mm. The reflecting surfaces 58 can collect and direct light 68 from light source 42 to increase the efficiency of the light delivery to active display 46. The reflecting surfaces 58 can angle about 25° relative to display optical axis B from a position slightly wider than the light source 42 to a position about the width or size of diffuser 62. It is understood that the sizes, shapes, dimensions and specifications can be varied to suit different situations.

Figure 8:
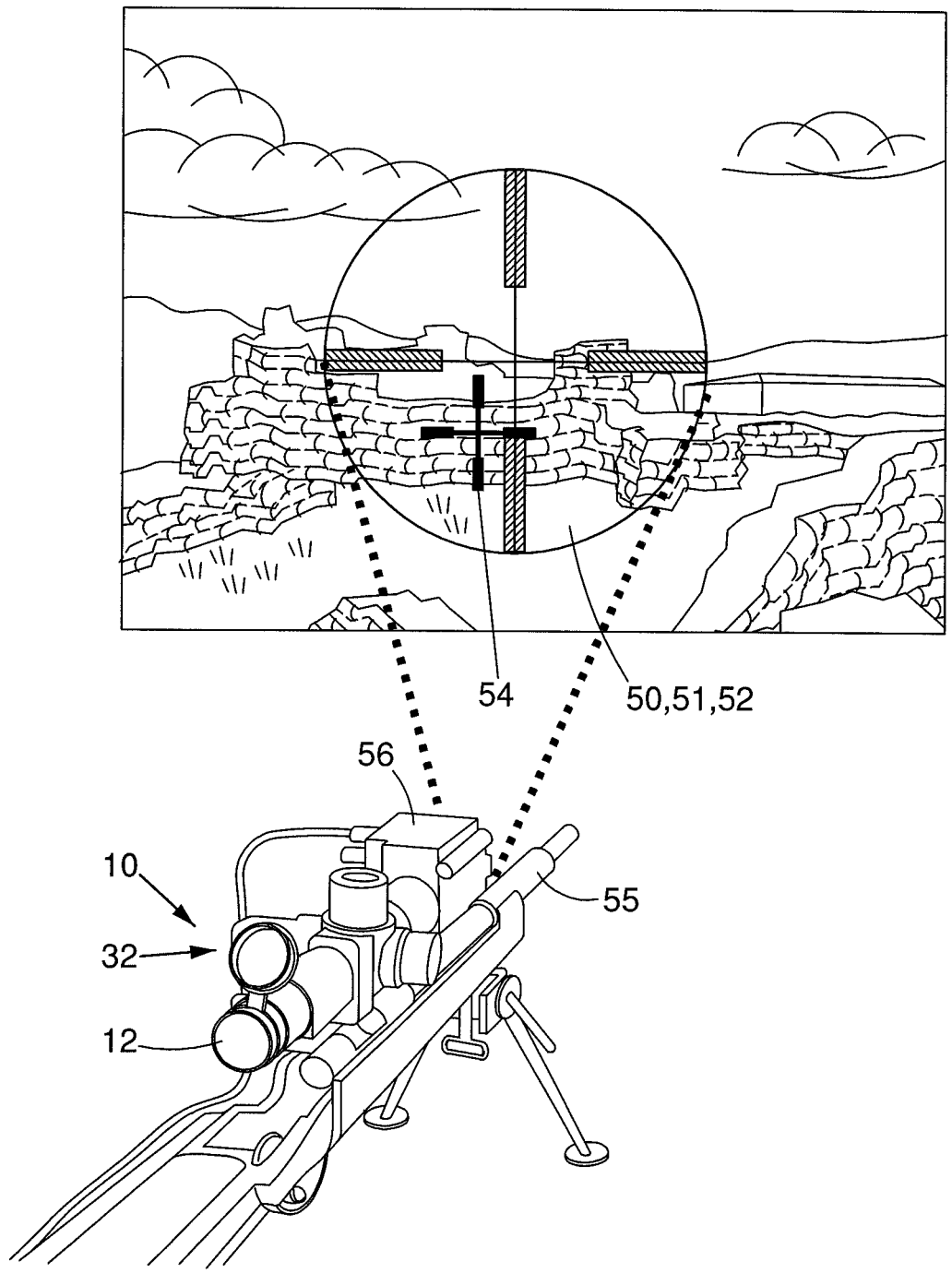
FIG. 8 is a perspective view of an embodiment of the present invention including a sniper sight overlay on a rifle and further showing a representation of the view through the optics.

FIG. 8 depicts an example of an embodiment of a viewer 10 mounted to a weapon such as a sniper rifle, including a variable magnification sniper sight or scope as the direct viewing optics 12, such as a 3.5–15×50 mm sniper sight. A view or image field 50 is also represented, showing real-world images 51 and an existing fixed reticle 52 seen through the direct viewing optics 12, as well as overlayed images 54 from the active display overlay unit 32, which can include an overlay reticle. A sniper sight, sighting device or apparatus 56 can also be mounted to the rifle 55 for measuring all relevant physical phenomena that can influence ballistic trajectory and calculate and display the offset aim point and confidence metric in the scope or direct viewing optics 12. The sighting device 56 can provide the ability to see the aim point on the target in both day or night, and can enable rapid target identification, weapon alignment, and measurement of range to target and crosswind profile. The sighting device 56 can be in communication with the active display overlay unit 32 for displaying images 54 in the image field 50, and can be mounted to the weapon 55 or can be separate. Some embodiments of sighting devices 56 can be positioned in front of the direct viewing optics 12.

Figure 9:
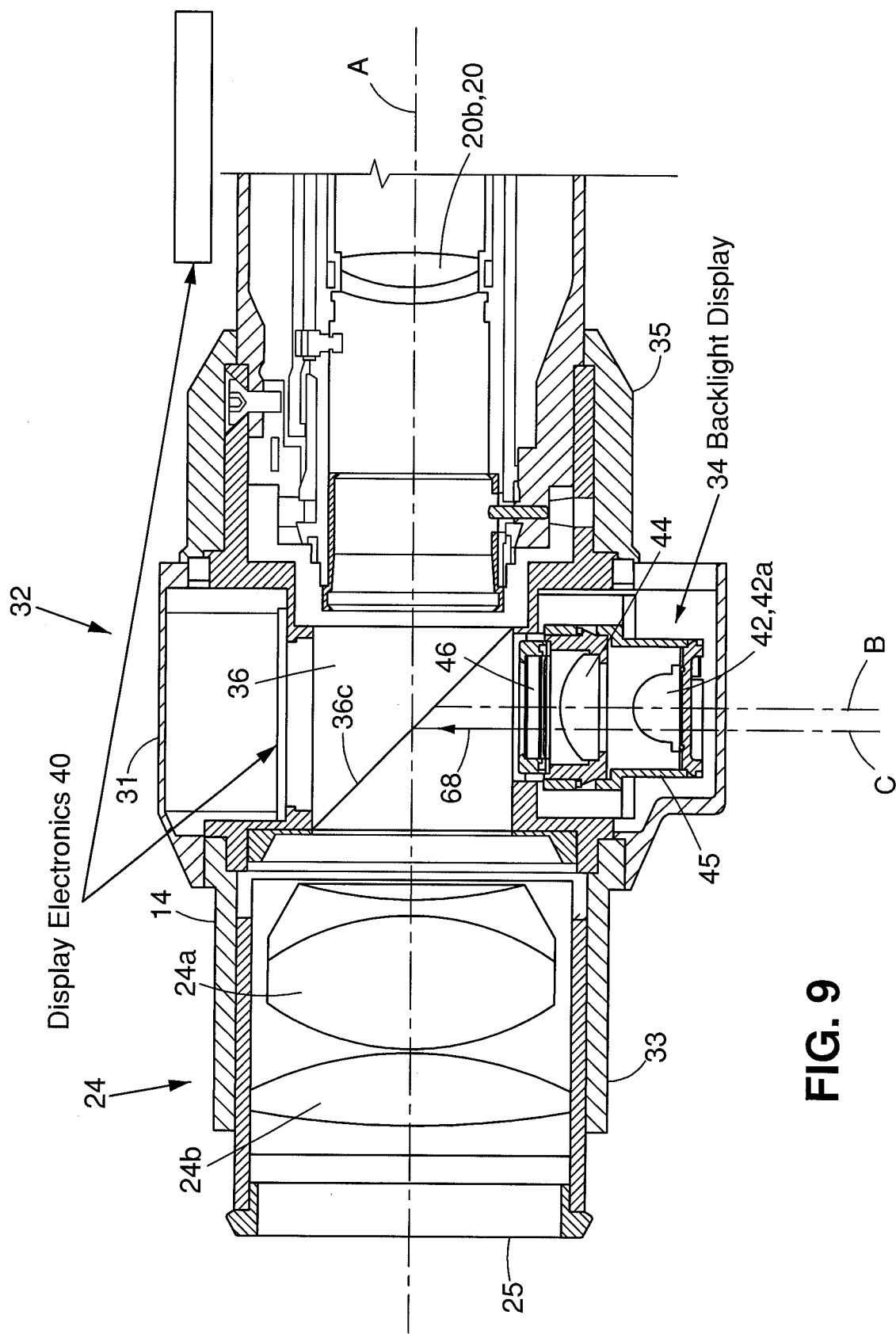
FIG. 9 is an enlarged side sectional view of a portion of an embodiment of a sight, scope or viewer in the present invention showing an embodiment of an active display overlay unit.

Referring to FIG. 9, the embodiment of the active display overlay unit 32 in FIG. 8 can include a housing, housing portion, or cover 31 for housing and positioning the beam combiner 36 along viewing optical axis A, between lens assemblies 24 and 20, and secured to housing portions 33 and 35. The backlight/display assembly 34 can be positioned within housing 31 adjacent to or against one side of the beam combiner 36, and the display optical axis B can be at a 90° or right angle to viewing optical axis A. The display electronics 40 can be housed within housing 31 at a position spaced apart from another side of the beam combiner 36. This can incorporate the active display overlay unit 32 within direct viewing optics 12 such as a rifle scope, while minimizing any increases in size of the scope.

Figure 11:
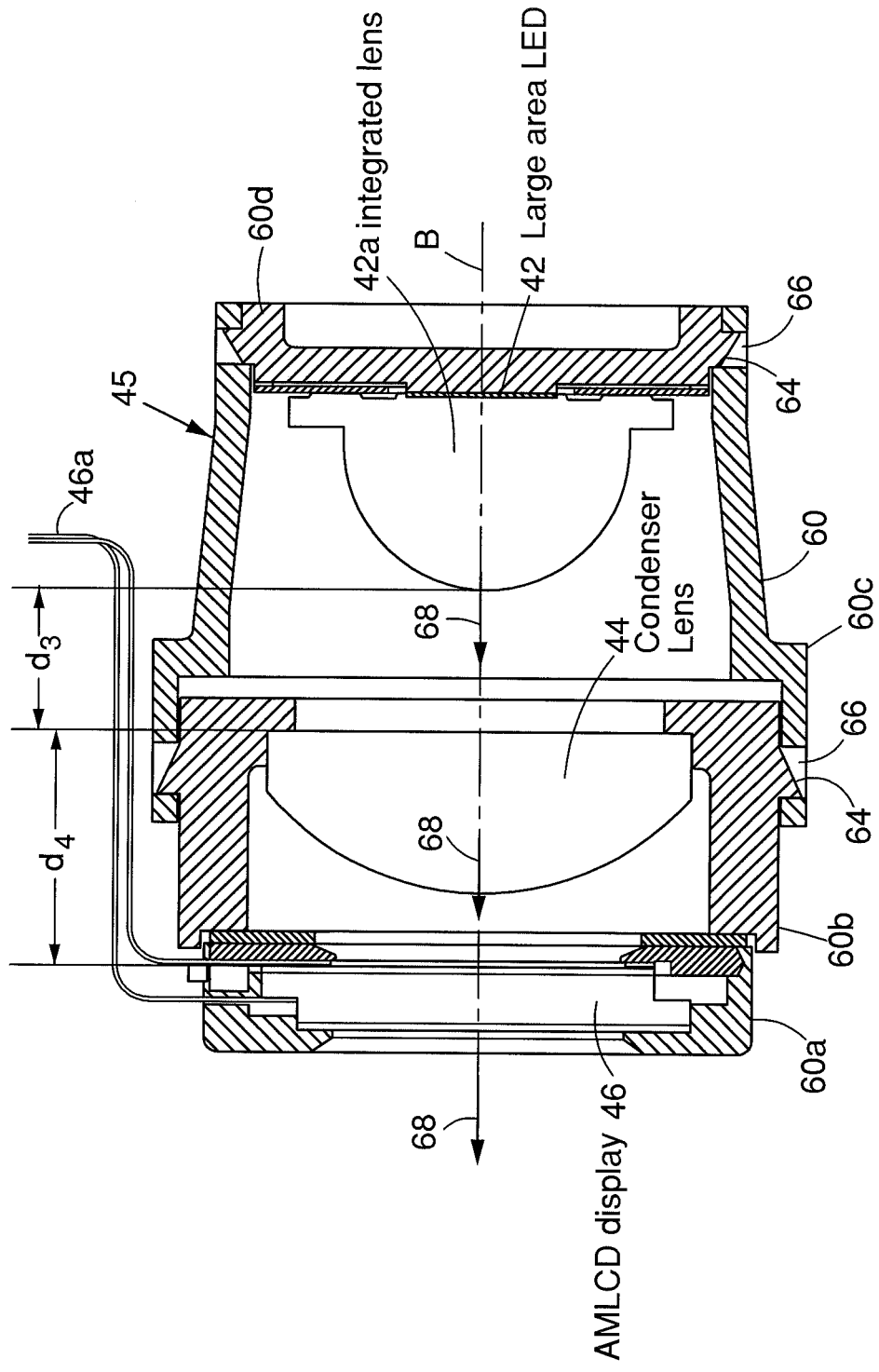
FIG. 11 is a schematic sectional view of the embodiment of FIG. 10.

Referring to FIGS. 10 and 11, the embodiment of the backlight/display assembly 34 in FIG. 9 can be generally rectangular in shape. Housing portions 60d and 60c can be secured to respective housing portions 60c and 60b, by insertion of locking protrusions 64 into recesses 66. The active display 46 can be a 640×480 monochrome display and the light source 42 can be a large area LED with a first or integrated lens 42a. The integrated lens 42a can have a generally hemispherical shape with a generally spherical front face and can collect maximum available light generated from the light source 42 and direct the light 68 to a second, illumination, or condenser lens 44, positioned between the light source 42 and the active display 46, all along display optical axis B. The condenser lens 44 can have a generally flat rear face or surface facing integrated lens 42, and a generally spherical front face with a larger radius than on the integrated lens 42a for concentrating light 68 received from integrated lens 42a onto active display 46 in an efficient manner. The first lens 42a is shaped to collect a maximum amount of light 68 available from light source 42, and the second lens is shaped and positioned to collect and direct the received light 68 onto active display 46 in a manner that provides uniform maximum brightness across the active display 46. The front face of the integrated lens 42a can be spaced from the rear face of condenser lens 44 by a distance $d_3$, for example about 4 mm, and the front face of condenser lens 44 can be spaced from the rear face of active display 46 by a distance $d_4$, for example about 2 mm. The light source 42 can be positioned within housing portion 60c, the condenser lens 44 can be positioned within housing portion 60b, and the active matrix 46 can be positioned within housing portion 60a, all secured along display optical axis B. This backlight/display assembly 34 with the two stage lens arrangement can have a very high brightness to power efficiency, with a monochrome luminance of at least 5000 fL or greater to the ocular of the host system at 332 mW, and can have about a 300:1 or greater contrast. A 5000 fL or greater luminance at 332 mW can provide a luminance to power fL:mW ratio of at least 15:1 or greater. Such luminance provided to the viewing optical axis A can allow the overlayed images 54 to be daytime viewable, while being power efficient.

Figure 12:
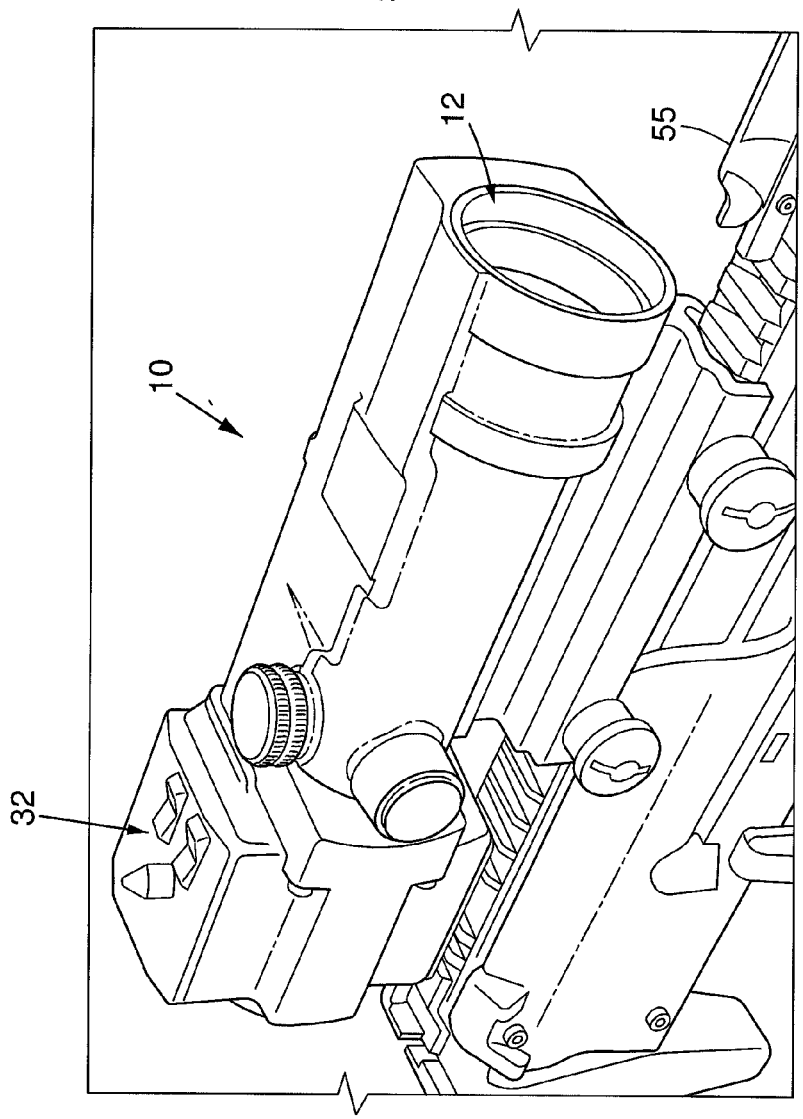
FIG. 12 is a perspective view of an embodiment of the present invention including a 3.5×35 ACOG sight on a gun.

FIG. 12 depicts an example of an embodiment of a viewer 10 attached to a weapon, gun or rifle 55, in which the direct viewing optics 12 is a 3.5×35 ACOG sight (Advanced Combat Optical Gunsight) or scope, which can be fixed magnification. The viewer 10 can include the backlight/display assembly 34 seen in FIGS. 10 and 11, and can have a 640×480 monochrome active display 46. The backlight/display assembly 34 can be part of an active display overlay unit 32 that can provide daytime viewable images 54 such as an overlay reticle system and can provide an image field such as shown and described for FIG. 4. The backlight/display assembly 34 can provide a monochrome luminance of at least 5000 fL or greater to the ocular of the host system at 332 mW, and can have about a 1,000,000:1 dimming range. A 5000 fL or greater luminance at 332 mW can provide a luminance to power fL:mW ratio of at least 15:1 or greater. Some embodiments can provide monochrome luminance at such levels to the eye.

Referring to FIGS. 13-15, the backlight/display assembly 34 and the beam combiner 36 of the active display overlay unit 32 of FIG. 12 can be horizontally aligned along display optical axis B at a right angle to viewing optical axis A. The beam combiner 36 can have a coating 36c with 50/50 non-polarizing coating, or implemented with a coating customized for red LED wavelength and s-polarization. The display electronics 40 can be positioned offset from and under the beam combiner 36 and backlight/display assembly 34.

Figure 16:
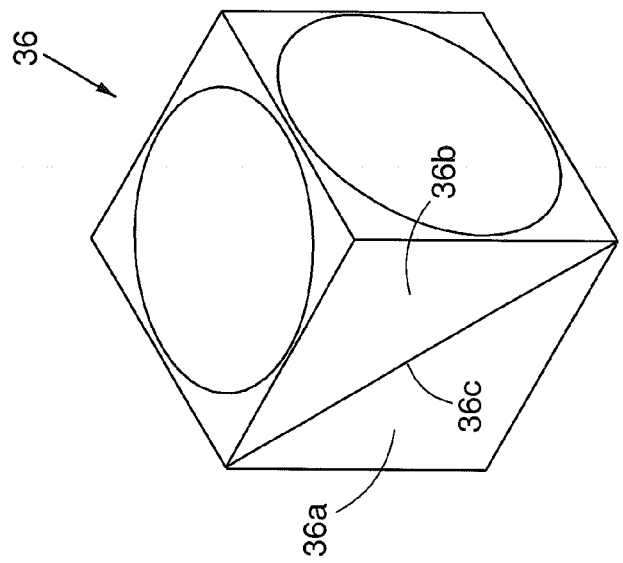
FIG. 16 is a schematic perspective view of an embodiment of a beam combiner.

Referring to FIG. 16, in some embodiments, the beam combiner 36 of the active display overlay unit of FIG. 12 can be cube shaped and formed of two optical members or elements 36a and 36b combined or bonded together. The coating 36c can be formed by coating one or both bonded hypotenuse surfaces with an optical thin film coating so that photopically weighted transmission (450 nm to 650 nm) for non-polarized light is greater than 90% for angles of incidence of 45°+/−8°. Reflectance (615 nm to 650 nm) for s-polarized light is greater than 90% for angles of incidence of 45°+/−8°. Anti-reflection coating can be applied to surfaces such that photopically weighted reflectance (450 nm to 650 nm) for non-polarized light is less than 0.5% for angles of incidence of 0°+/−10°. Anti-reflection coating can be applied to surfaces such that photopically weighted reflectance (615 nm to 650 nm) for non-polarized light is less than 0.5% for angles of incidence of 0°+/−10°. This can form a customized red s-polarized reflective coating for the beam combiner 36. It is understood that different coatings can be applied to beam combiner 36 to meet the requirements of different embodiments in the present invention, shown and described.

Figure 17:
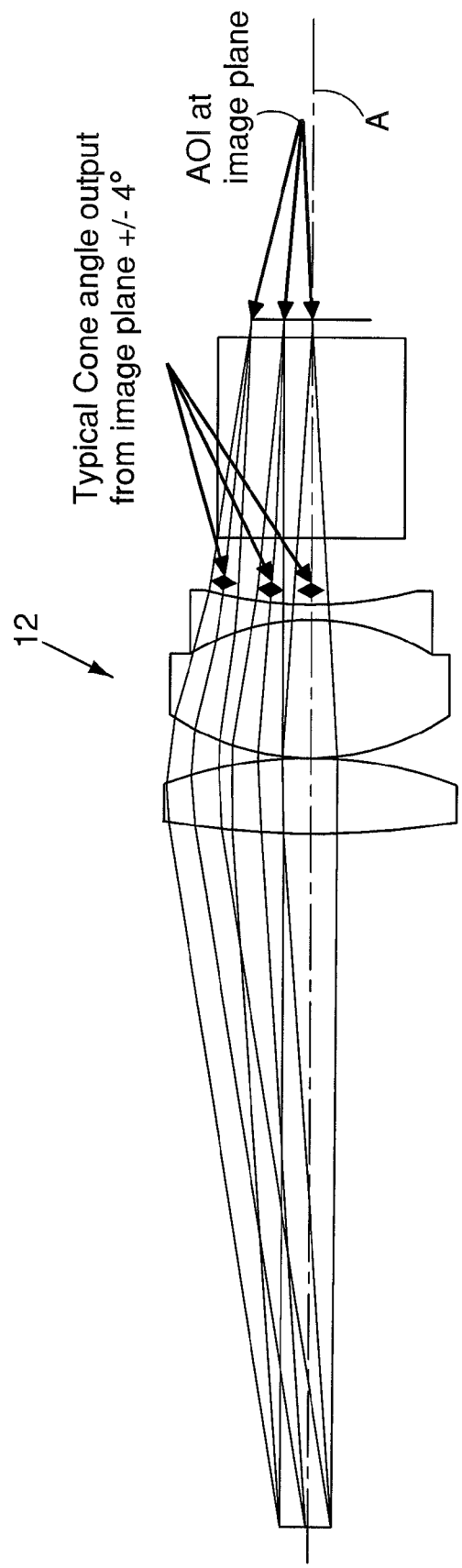
FIG. 17 is a schematic drawing of an embodiment of direct view optics.

Referring to FIG. 17, the direct viewing optics 12, such as in a weapon sight such as a rifle or gun sight or scope, can have well defined and limited angles of incidence (AOI) at the image plane, and can have small cone angles of illumination at the image plane less than about +/−10°, such as +/−4°. Embodiments of the active display overlay unit 32 can be configured to provide illumination that matches, or approximately or substantially matches the angles of incidence of the direct viewing optics 12 at the image plane to obtain optimum simultaneous viewing at the eyepiece 25 of images from both optical axes A and B, for images 51 viewed by the direct viewing optics 12, and for images 54 generated by active display overlay unit 32.

Figure 18:
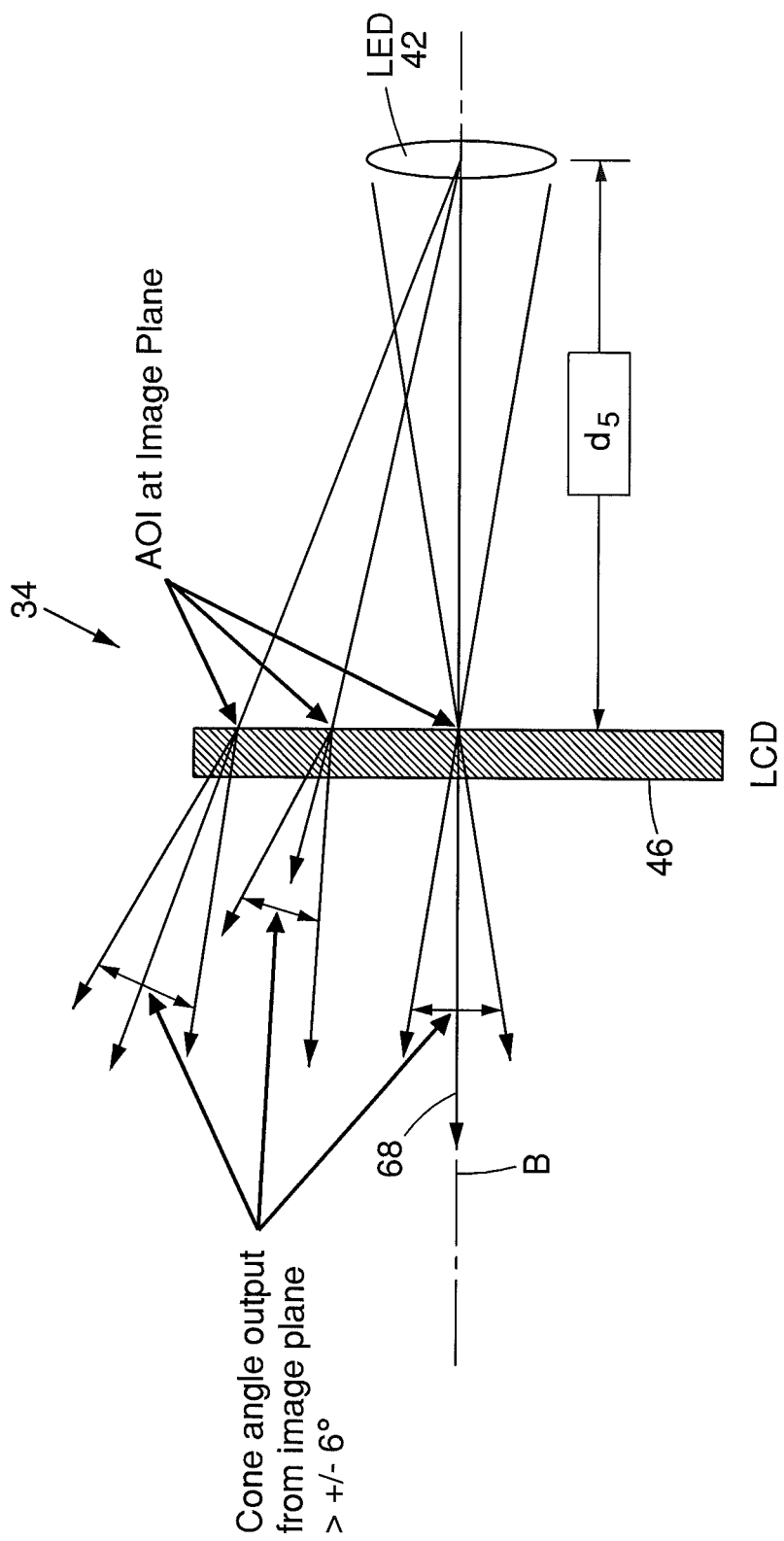
FIG. 18 is a schematic drawing of one embodiment of a backlight/display assembly arrangement.

Referring to FIG. 18, in one embodiment, the backlight/display assembly 34 for the direct viewing optics 12 of FIG. 17, can have a light source 42, such as an LED illuminating the active display 46, which can be an LCD such as shown and described with respect to FIG. 5. The backlight/display assembly 34 can be similar to that in FIG. 7. The LED light source 42 can be positioned a distance $d_5$ from the active display 46, and can directly illuminate the active display 46, with light 68 to produce a very high luminance of the surface of the active display 46 to obtain a high luminance of images 54 in the eyepiece 25 of the direct viewing optics 12, while matching, or approximately or substantially matching the images of incidence and cone angles at the image plane of the direct viewing optics 12. The size and location of the light source 42 relative to the active display 46 can be selected to provide desired angles of incidence and cone angles of illumination of light 68 at the active display 46. In direct illumination of active display 46 by light source 42, the illumination or light 68 is under divergent conditions. In one embodiment, the light source 42 can be a large area LED with dimensions of about 3×3 mm at a distance $d_5$ of about 14 mm and provide about +/−6° of cone angle output from the image plane of the active display 46. In another embodiment, the light source 42 can be a medium area LED of about 1×1 mm at a distance $d_5$ of about 14 mm and provide about +/−2° of cone angle output from the image plane of the active display 46. In another embodiment, the light source 42 can be a small area LED of about 0.5×0.5 mm at a distance $d_5$ of about 14 mm, and provide about +/−1° of cone angle output from the image plane of the active display 46. As a result, cone angles of +/−6° or less can be achieved to match or substantially match, or approximately match the direct viewing optics 12. The angles of incidence can be halfway between or bisect the cone angles as shown. In some embodiments, light source 42 can have an integrated lens 42a if desired.

Figure 19:
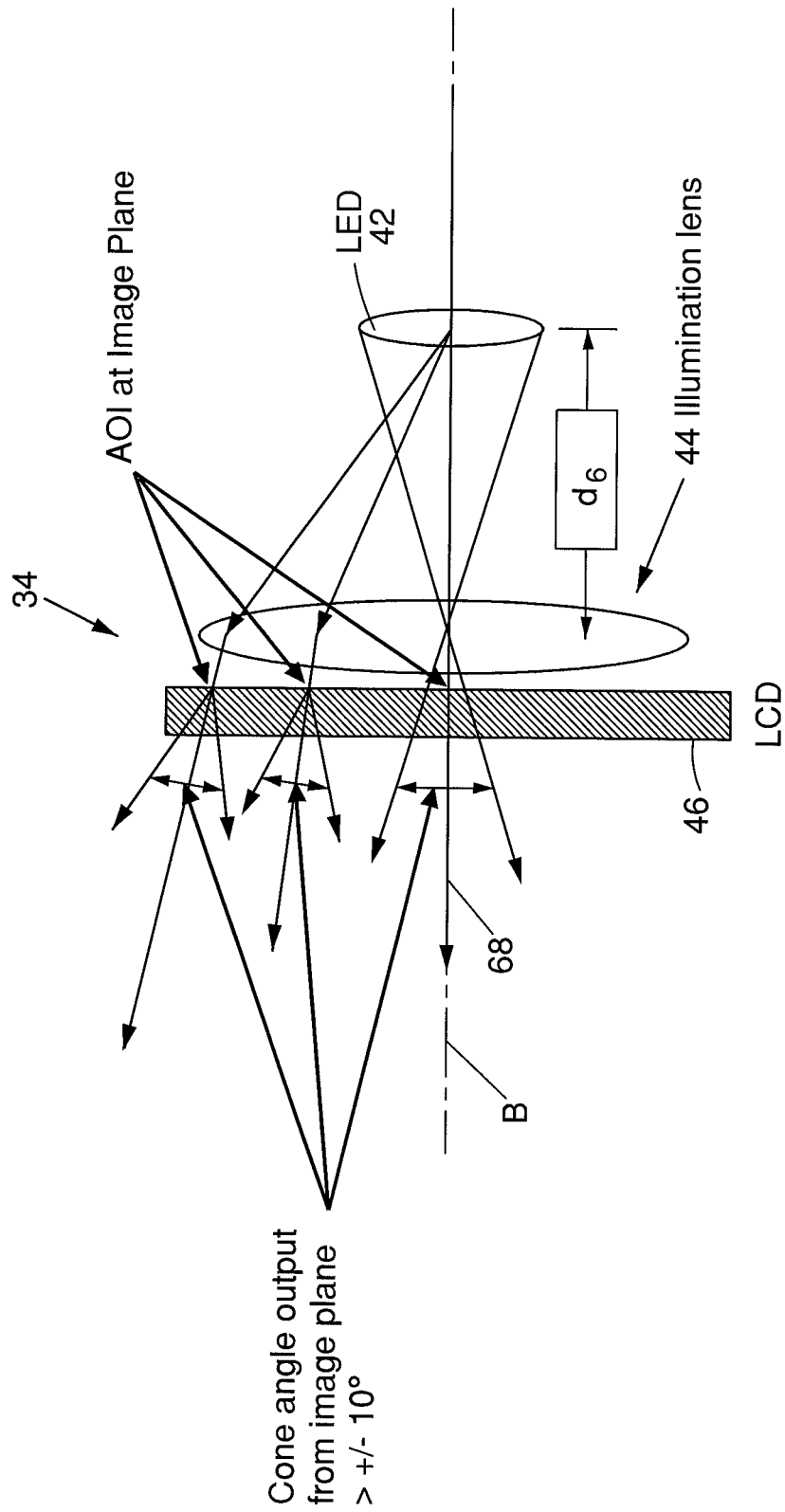
FIG. 19 is a schematic drawing of another backlight/display assembly arrangement.

Referring to FIG. 19, in another embodiment, the backlight/display assembly 34 for the direct viewing optics 12 of FIG. 17 can have a light source 42, such as an LED for illuminating the active display 46, which can be an LCD such as shown and described with respect to FIG. 5. A condenser or illumination lens 44 can be positioned between the light source 42 and the active display 46, and can be spaced apart from the light source 42 by a distance $d_6$, and the assembly can be similar to any of the backlight/display assemblies 34 shown in FIGS. 1-3 and 9-11. The lens 44 can be in front of and adjacent to or next to the active display 46 and receives light 68 from light source 42 and directs the light 68 onto the active display 46 in a manner to obtain a high luminance of images 54 in the eyepiece 25 of the direct viewing optics 12, while matching, or approximately or substantially matching the angles of incidence and cone angles at the image plane of the direct viewing optics 12. The size and location of the light source 42 relative to the active display 46 and the lens 44 can be selected to provide desired angles of incidence and cone angles of illumination or light 68 at the active display 46. In one embodiment, the light source 42 can be a large area LED with dimensions of about 3×3 mm at a distance $d_6$ of about 8 mm and provide about a +/−10° of cone angle output from the image plane of the active display 46. In another embodiment, the light source 42 can be a medium area LED of about 1×1 mm at a distance $d_6$ of about 8 mm and provide about a +/−3.3° of cone angle output from the image plane of the active display 46. In another embodiment, the light source 42 can be a small area LED of about 0.5×0.5 mm at a distance of about 8 mm and provide about a +/−1.6° of cone angle output from the image plane of the active display 46. As a result, cone angles of +/−10° or less can be achieved to match, or approximately or substantially match the direct viewing optics 12. The angles of incidence can be about halfway between or bisect the cone angles, as shown. The lens 44 and its design can allow angles of incidence of illumination at the active display to match, or approximately or substantially match viewing optics that are divergent or convergent independent of light source 42 distance. In some embodiments, the light source 42 can include an integrated lens 42a. The designs of the backlight/display assemblies 34 and active display overlay unit 32 shown and described can provide high luminance images 54 to be produced in a manner that can be seen simultaneously with images viewed with the direct viewing optics, even during the day.

The viewer 10 in the present invention, can have a variety of uses and embodiments, and can be a weapon sight, such as a rifle sight or scope, a sighting and surveillance system, a fire-control system, a laser target locator and designator, a range finder, a monocular or binocular viewing system (either hand-held or head/helmet mounted), or add-on accessory devices thereof, and the field of view can include target elements therein. The viewing optics can be positioned along a longitudinal viewing optical axis or folded such as in a periscope. The active display overlay unit can include a display element for generating the images, including text and symbology along a display optical axis. A beam combiner or other means to optically combine the images can be aligned with the display along the display optical axis, and positioned along the viewing optical axis of the viewing optics for directing the images from the display onto the viewing optical axis for combining with the field of view that is viewed by the viewing optics with those of the display in an overlaid manner. The display optical axis of the active display overlay unit can be at any angle to the viewing optical axis of the viewing optics, and can include right angles. The active display overlay unit can utilize a reflective display element, a transmissive display element or an emissive display element, which can be an active display. It can further include an LED backlight for illuminating a transmissive display or active display with LED illumination. A lens arrangement can focus or concentrate the LED illumination onto the transmissive display or active display and into the viewing area. Electronics can control the display, the display format and content as well as the relative position of imagery and symbology with respect to the viewing optical axis. The display can provide text, alpha-numerics, symbology and/or video imagery including an active target reticle, range and wind information, GPS and compass information, target ID, and/or external sensor information.

The display overlay unit can receive external information and display a weapon solution based upon a ballistic calculation and environmental conditions such as temperature, altitude, humidity, wind velocity, air density and earth rotation coupled with target and ballistics information such as range to target, wind profile to target, specific rifle bore, shot load, barrel length and target speed. The display overlay unit may contain an internal symbol set and position symbology according to external commands or receive display information and position externally. The display overlay unit can output or provide monochrome, multi-color and/or full color overlaid image content, can be bi-level and/or full gray-scale image capable and can provide a high brightness display with dimming capability to support a wide range of ambient viewing conditions ranging from full sunlight to overcast starlight. In particular embodiments, the display overlay unit can provide at least one of full-color and monochrome luminance of at least about 1200 fL to the ocular of the host system with a luminance to power fL:mW ratio of at least about 6:1 or greater, for example, full color luminance of at least about 1200 fL or greater at about 200 mW, or monochrome luminance of at least about 5000 fL or greater at about 332 mW. The dimming range and spectral content or specific wavelength of imagery of the display can be such that the display can be dimmed to a level allowing the user to view the overlaid image and real-world scene through the viewing optics with image intensifier (night vision goggle) based products or thermal imaging devices.

A housing can be included for containing the viewing optics and the display overlay unit. The complete unit can be mounted as an external accessory device which is then coupled to the real-world optical viewing device or integrated into a larger system such as a fire-control, target locator/designator or weapon sight system. The unit can be packaged as an integral part of the real-world viewing system. In some embodiments, the active overlay display function can be an add-on accessory device to the real-world viewing system. The accessory device can contain features both mechanically and electrically to boresight (align) the overlaid display from the display overlay unit to the optical axis of the real-world viewer.

While this invention has been particularly shown and described with references to example embodiments thereof, it will be understood by those skilled in the art that various changes in form and details may be made therein without departing from the scope of the invention encompassed by the appended claims.

For example, various features can be combined together or omitted. In addition, dimensions and the orientation of components can be varied. In embodiments where the direct viewing optics 12 are folded, the viewing optical axis A can be folded and the display optical axis B can be aligned with one portion of the viewing optical axis A.

What is claimed is:

1. A real-world viewer comprising:
viewing optics positioned along a viewing optical axis for viewing a field of view of the real-world; and
an active display overlay unit optically coupled to the viewing optical axis of the viewing optics, for generating images and directing the images along the viewing optical axis of the viewing optics for simultaneous overlaid viewing of the images and the real-world scene as viewed in the field of view through the viewing optics, the active display overlay unit providing at least one of monochrome and full-color luminance ranging from 1200 fL or greater to the ocular of the host system with a luminance to the ocular of the host system to power consumption fL:mW ratio of 6:1 or greater, in which the active display overlay unit comprises:
an active transmissive display for generating the images;
an LED backlight for illuminating the active transmissive display with LED illumination;
a lens arrangement for concentrating the LED illumination onto the active transmissive display; and
a beam combiner aligned with the active transmissive display, and positioned along the viewing optical axis of the viewing optics for directing the images from the active transmissive display onto the viewing optical axis for combining with the field of view that is viewed by the viewing optics in an overlaid manner.

2. The viewer of claim 1 in which the viewer is at least one of a weapon sight, an add-on accessory to a weapon sight, a rifle sight, an add-on accessory to a rifle sight, a surveillance system, an add-on accessory to a surveillance system, a fire-control system, an add-on accessory to a fire-control system, a laser target locator and designator, an add-on accessory to a laser target locator and designator, a head or helmet mounted display, an add-on accessory to a head or helmet mounted display, a range finder or an add-on accessory to a range finder.

3. The viewer of claim 2 in which the field of view includes target or situational awareness elements therein.

4. The viewer of claim 2 further comprising mechanical and electrical boresight capabilities to the real world viewing optical axis.

5. The viewer of claim 1 in which the viewing optics are positioned along a longitudinal viewing optical axis.

6. The viewer of claim 5 in which a display optical axis of the active display overlay unit is at an angle to the viewing optical axis of the viewing optics.

7. The viewer of claim 1 in which the LED backlight has a cone angle of illumination from the active transmissive display that substantially matches the viewing cone angle of the viewing optics.

8. The viewer of claim 7 in which the LED backlight has a cone angle of illumination of about +/−10° or less from the active transmissive display.

9. The viewer of claim 1 in which the lens arrangement comprises an integrated lens integrated in the LED backlight and a condenser lens positioned between the integrated lens and the active transmissive display.

10. The viewer of claim 9 in which the active display overlay unit is configured for providing monochrome luminance of at least 5000 fL to the ocular of the host system with a luminance to the ocular of the host system to power consumption fL:mW ratio of at least 15:1 or greater.

11. The viewer of claim 9 further comprising a housing for containing the viewing optics and the active display overlay unit.

12. The viewer of claim 1 further comprising electronics for controlling the active display.

13. The viewer of claim 12 in which the active display has images for at least one of active target reticle, range and wind information, GPS and compass information, target ID, and/or external sensor information.

14. The viewer of claim 1 in which the active overlay display unit has brightness control to allow for viewing under ambient conditions ranging from full sunlight to overcast starlight.

15. The viewer of claim 1 in which the active overlay display unit has a specific wavelength of imagery and dimming for viewing the real world and active overlay display unit images using an image intensifier night vision device or thermal imaging device.

16. The viewer of claim 1 in which the active overlay display unit has at least one of a monochrome, multi-color and/or full color overlaid image.

17. The viewer of claim 1 in which the active overlay display unit has at least one of a bi-level and/or full gray scale overlay image.

18. The viewer of claim 1 further comprising means to package the active display overlay unit as an integral part of the real-world viewer.

19. The viewer of claim 1 in which the active display overlay unit is an accessory add-on device to the real-world viewer.

20. The viewer of claim 1 in which the LED backlight is about 3 mm×3 mm or less in size and the lens arrangement comprises a first lens having a generally spherical front face integrated with the LED backlight for collecting and directing generated LED illumination to a second lens having a generally spherical front face for collecting, concentrating and directing the LED illumination onto the active transmission display.

21. A weapons sight comprising:
direct viewing optics positioned along a longitudinal viewing optical axis for viewing a field of view of the real-world;
an active display overlay unit optically coupled to the viewing optical axis of the viewing optics, for generating images and directing the images along the viewing optical axis of the viewing optics for simultaneous overlaid viewing of the images and the real-world scene as viewed in the field of view through the viewing optics, the active display overlay unit with power consumption starting at 200 mW providing at least one of monochrome and full-color luminance ranging from 1200 fL or greater to the ocular of the host system with a luminance to the ocular of the host system to power consumption fL:mW ratio of 6:1 or greater, the active display overlay unit comprising an active transmissive display for generating the images along a display optical axis, an LED backlight for illuminating the active transmissive display with LED illumination and configured to provide a cone angle of about +/−10° or less from the active transmissive display, a lens arrangement for concentrating the LED illumination onto the active transmissive display, and a beam combiner aligned with the active transmissive display along the display optical axis, and positioned along the viewing optical axis of the viewing optics for directing the images from the active transmissive display onto the viewing optical axis for combining with the field of view that is viewed by the viewing optics in an overlaid manner.

22. A method of viewing with a real-world viewer comprising:
viewing a field of view of the real-world with viewing optics positioned along a viewing optical axis; and
simultaneously viewing images generated by an active display overlay unit optically coupled to the viewing optical axis of the viewing optics, the images being directed along the viewing optical axis of the viewing optics for simultaneous overlaid viewing of the images and the real-world scene as viewed in the field of view through the viewing optics, the active display overlay unit providing at least one of monochrome and full-color luminance ranging from 1200 fL or greater to the ocular of the host system with a luminance to the ocular of the host system to power consumption fL:mW ratio of 6:1 or greater, in which the active display overlay unit comprises:
an active transmissive display for generating the images;
an LED backlight for illuminating the active transmissive display with LED illumination;
a lens arrangement for concentrating the LED illumination onto the active transmissive display; and
a beam combiner aligned with the active transmissive display, and positioned along the viewing optical axis of the viewing optics for directing the images from the active transmissive display onto the viewing optical axis for combining with the field of view that is viewed by the viewing optics in an overlaid manner.

23. The method of claim 22 further comprising employing the viewer as at least one of a weapon sight, an add-on accessory to a weapon sight, a rifle sight, an add-on accessory to a rifle sight, a surveillance system, an add-on accessory to a surveillance system, a fire-control system, an add-on accessory to a fire control system, a laser target locator and designator, an add-on accessory to a laser target locator and designator, a head or helmet mounted display, an add-on accessory to a head or helmet mounted display, a range finder, or an add-on accessory to a range finder.

24. The method of claim 23 further comprising viewing target or situational awareness elements in the field of view.

25. The method of claim 23 further comprising providing mechanical and electrical boresight capabilities to the real-world viewing optical axis.

26. The method of claim 22 further comprising positioning the viewing optics along a longitudinal viewing optical axis.

27. The method of claim 26 further comprising positioning a display optical axis of the active display overlay unit at an angle to the viewing optical axis of the viewing optics.

28. The method of claim 22 further comprising providing a cone angle of illumination from the active transmissive display that substantially matches the viewing cone angle of the viewing optics.

29. The method of claim 28 further comprising providing a cone angle of illumination of about +/−10° or less from the active transmissive display.

30. The method of claim 22 further comprising providing the lens arrangement with an integrated lens integrated in the LED backlight and a condenser lens positioned between the integrated lens and the active transmissive display.

31. The method of claim 30 further comprising providing monochrome luminance from the active display overlay unit of at least 5000 fL to the ocular of the host system with a luminance to the ocular of the host system to power consumption fL:mW ratio of at least 15:1 or greater.

32. The method of claim 30 further comprising containing the viewing optics and the active display overlay unit within a housing.

33. The method of claim 22 further comprising controlling the active display with electronics.

34. The method of claim 33 further comprising providing images for at least one of active target reticle, range and wind information, GPS and compass information, target ID, and/or external sensor information, with the active display.

35. The method of claim 22 further comprising controlling the active display brightness to allow for viewing under ambient conditions ranging from full sunlight to overcast starlight.

36. The method of claim 22 further comprising outputting a specific wavelength of imagery and dimming of the active overlay display unit for viewing the real-world and active overlay display unit images using an image intensifier night vision device or thermal imaging device.

37. The method of claim 22 further comprising providing at least one of a monochrome, multi-color and/or full color overlaid image.

38. The method of claim 22 further comprising providing a bi-level and/or full gray scale overlay image.

39. The method of claim 22 further comprising providing a means to package the active display overlay unit as an integral part of the real-world viewer.

40. The method of claim 22 further comprising providing the active display overlay unit as an accessory add-on device to the real-world viewer.

41. The method of claim 22 further comprising providing the LED backlight with a size about 3 mm×3 mm or less, and the lens arrangement with a first lens having a generally spherical front face integrated with the LED back light for collecting and directing generated LED illumination to a second lens having a generally spherical front face for collecting, concentrating and directing the LED illumination onto the active transmission display.

42. A method of viewing with a weapons sight comprising:
viewing a field of the real-world with direct viewing optics positioned along a longitudinal viewing optical axis;
simultaneously viewing images generated by an active display overlay unit optically coupled to the viewing optical axis of the viewing optics, the images being directed along the viewing optical axis of the viewing optics for simultaneous overlaid viewing of the images and the real-world scene as viewed in the field of view through the viewing optics, the active display overlay unit with power consumption starting at 200 mW providing at least one of monochrome and full-color luminance ranging from 1200 fL or greater to the ocular of the host system with a luminance to the ocular of the host system to power consumption fL:mW ratio of 6:1 or greater, the active display overlay unit comprising an active transmissive display generating the images along a display optical axis, an LED backlight illuminating the active transmissive display with LED illumination and configured to provide a cone angle of about +/−10° or less from the active transmissive display, a lens arrangement for concentrating the LED illumination onto the active transmissive display, and a beam combiner aligned with the active transmissive display along the display optical axis, and positioned along the viewing optical axis of the viewing optics for directing the images from the active transmissive display onto the viewing optical axis for combining with the field of view that is viewed by the viewing optics in an overlaid manner.

* * * * *